G. L. IVES.
Improvement in Horse Hay-Rakes.
No. 130,431. Patented Aug. 13, 1872.
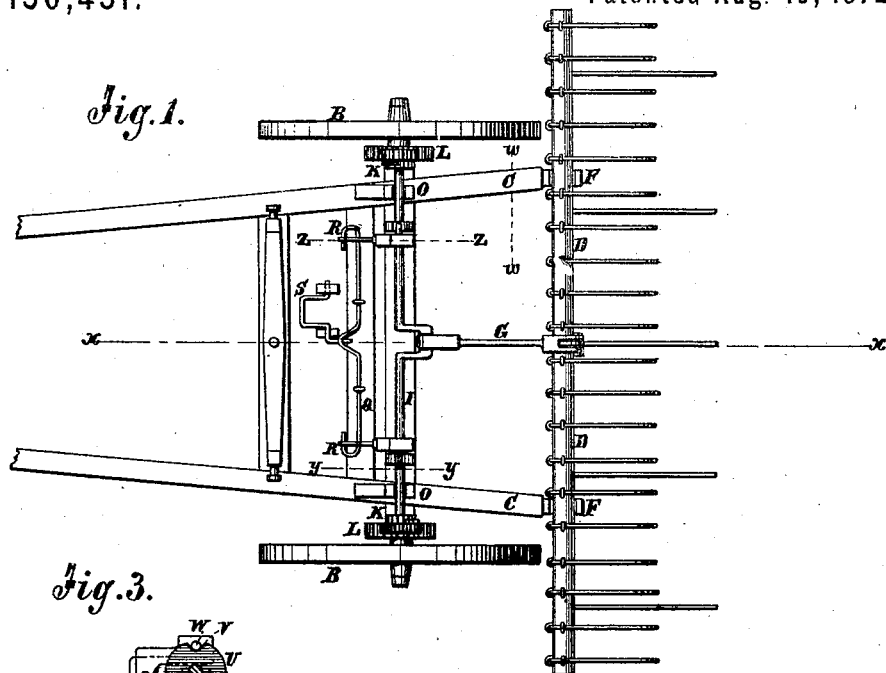
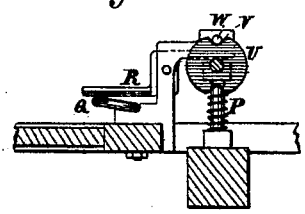
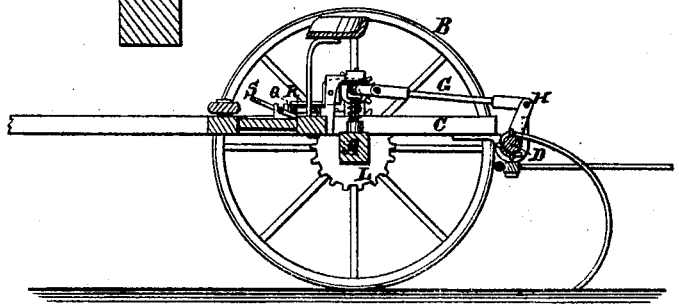
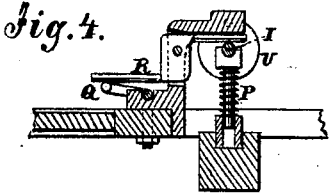
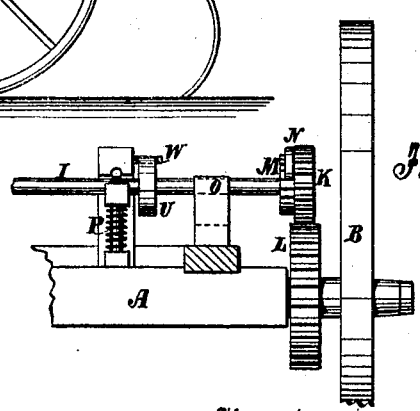
Witnesses:
A Benneckendorf.
W. A. Graham.
Inventor:
George L. Ives.
per ———
Attorneys.

UNITED STATES PATENT OFFICE.

GEORGE L. IVES, OF ROME, NEW YORK.

IMPROVEMENT IN HORSE HAY-RAKES.

Specification forming part of Letters Patent No. 130,431, dated August 13, 1872.

Specification describing a new and Improved Horse Hay-Rake, invented by GEORGE L. IVES, of Rome, in the county of Oneida and State of New York.

My invention has special reference to an improvement in the arrangement of the crank-shaft and tripping mechanism, whereby the rake is raised and lowered for discharging the gathered hay.

Figure 1 is a plan view of a hay-rake constructed according to my improved plan. Fig. 2 is a sectional elevation taken on the line $xx$ of Fig. 1. Fig. 3 is a section through the axle and crank-shaft taken on the line $yy$ of Fig. 1. Fig. 4 is a section taken on the line $zz$; and Fig. 5 is a section on the line $ww$.

Similar letters of reference indicate corresponding parts.

I propose to extend the crank-shaft to both wheels, and gear it with them by pinions K and wheels L, and arrange the pinions so they can turn backward on the crank-shaft loosely, but provide a ratchet, M, and pawl N, so that in turning forward they engage the shaft and turn it. Thus I can have a double-geared arrangement for working the rake without side draft, and yet it will not interfere with the running of the machine around curves, or the turning of one of the truck-wheels faster than the other.

For gearing the crank-shaft with the truck-wheels and ungearing it, it is mounted in the vertically-slotted bearings O, to rise and fall with springs P under it to throw it up out of gear automatically as soon as the rake has been let down again, and a crooked rock-shaft, Q, levers R, and foot-lever S are arranged with it, as shown, for forcing it down into gear at the proper time. To hold the said shaft in gear the time required for raising the rake and letting it down again, which is accomplished during half a revolution of the crank-shaft, I have provided the disks U on the crank-shaft with two notches, V, in the face opposite each other, and the fixed stop-pins W, above or opposite the springs P. These disks and pins hold the crank-shaft down after it is put in gear by the operator until the notches come to the pins, when the springs will instantly throw the shaft up out of gear as high as the notches will allow. The shaft is instantly locked against revolving by its momentum, and held by the pins, so that when put in gear again it must turn a half revolution, and thus give a complete operation to the rake each time.

I do not claim, broadly, the employment of notched disks, nor gearing the crank-shaft which operates the rake with both wheels; but—

Having thus described my invention, I claim as new and desire to secure by Letters Patent—

The foot-lever S, rock-shaft Q, levers R, crank-shaft I, connecting-rod G, notched disks U, pins W, slotted bearings O, springs P, pinions K, gear-wheels L, and wheels B, all arranged as shown and described.

GEORGE L. IVES.

Witnesses:
LORENZO R. COVELL,
CYRUS GREENE.